United States Patent [19]

Appleberry

[11] Patent Number: 5,156,062
[45] Date of Patent: Oct. 20, 1992

[54] ANTI-ROTATION POSITIONING MECHANISM

[75] Inventor: Walter T. Appleberry, Long Beach, Calif.

[73] Assignee: Rockwell International Corporation, Seal Beach, Calif.

[21] Appl. No.: 724,062

[22] Filed: Jul. 1, 1991

[51] Int. Cl.$^5$ ............................................. G05G 11/00
[52] U.S. Cl. ....................................... 74/479; 901/15; 901/28
[58] Field of Search ....................... 74/479; 901/28, 15

[56] References Cited

U.S. PATENT DOCUMENTS

| | | | |
|---|---|---|---|
| 4,651,589 | 3/1987 | Lambert | 901/28 X |
| 4,806,068 | 2/1989 | Kohli et al. | 74/479 X |
| 4,976,582 | 12/1990 | Clavel | 74/479 X |

Primary Examiner—Rodney H. Bonck
Assistant Examiner—Ryan W. Massey
Attorney, Agent, or Firm—Lawrence N. Ginsberg; Charles T. Silberberg

[57] ABSTRACT

An apparatus for maintaining the angular position of a platform during motion of the platform in any direction relative to a base. The apparatus includes a static base, a platform, a first arm assembly, a second arm assembly and a third arm assembly. Each arm assembly has one terminal portion connected to a portion of the static base, by a universal joint, and another terminal portion, connected to the platform, by another universal joint. Each arm assembly is so constructed to permit changes in the distance between its universal joints, but concomitantly removes a degree of angular freedom from the platform. The angular position of the platform is thereby maintained when the distance between the respective universal joints is changed.

10 Claims, 4 Drawing Sheets

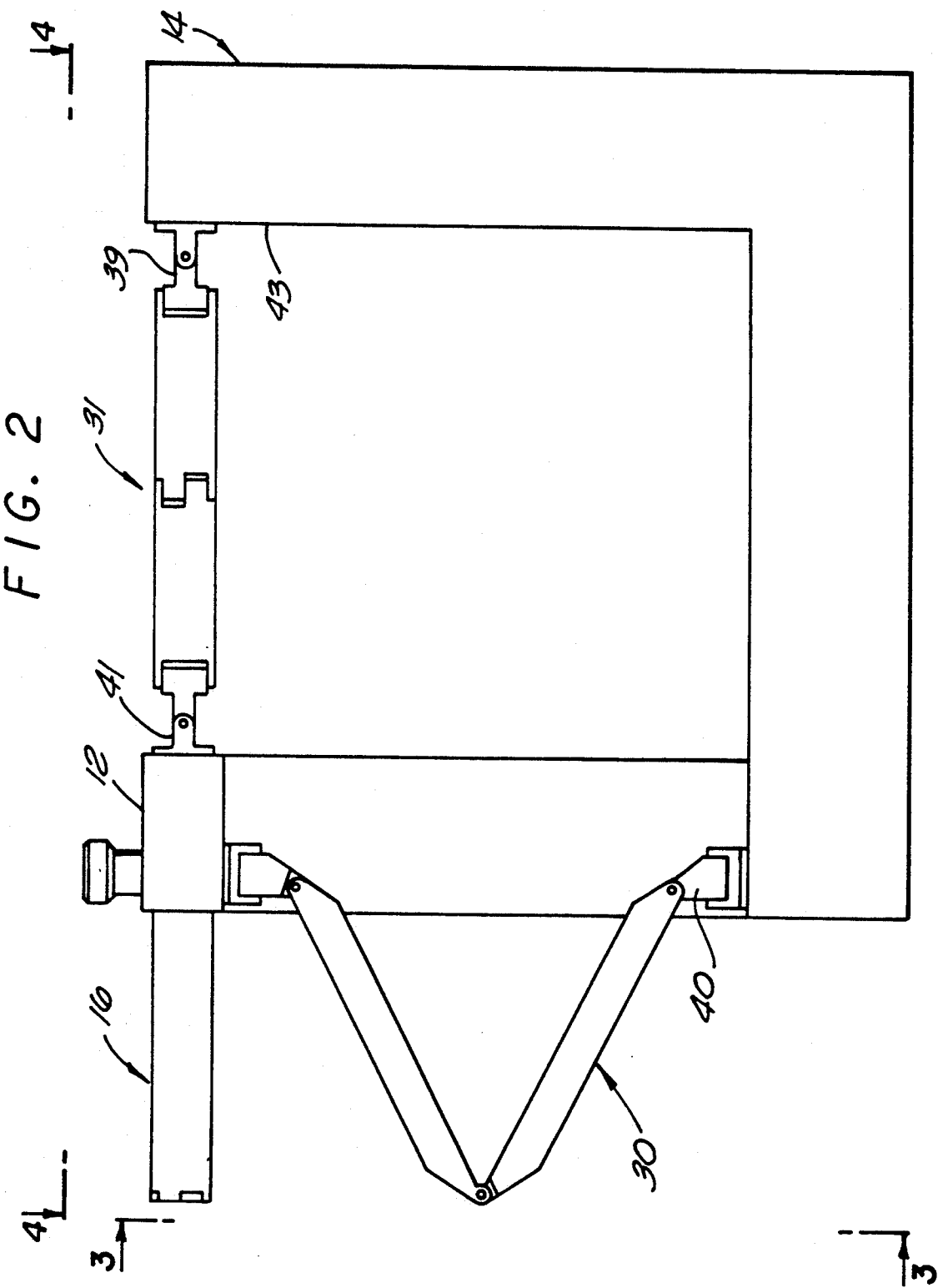

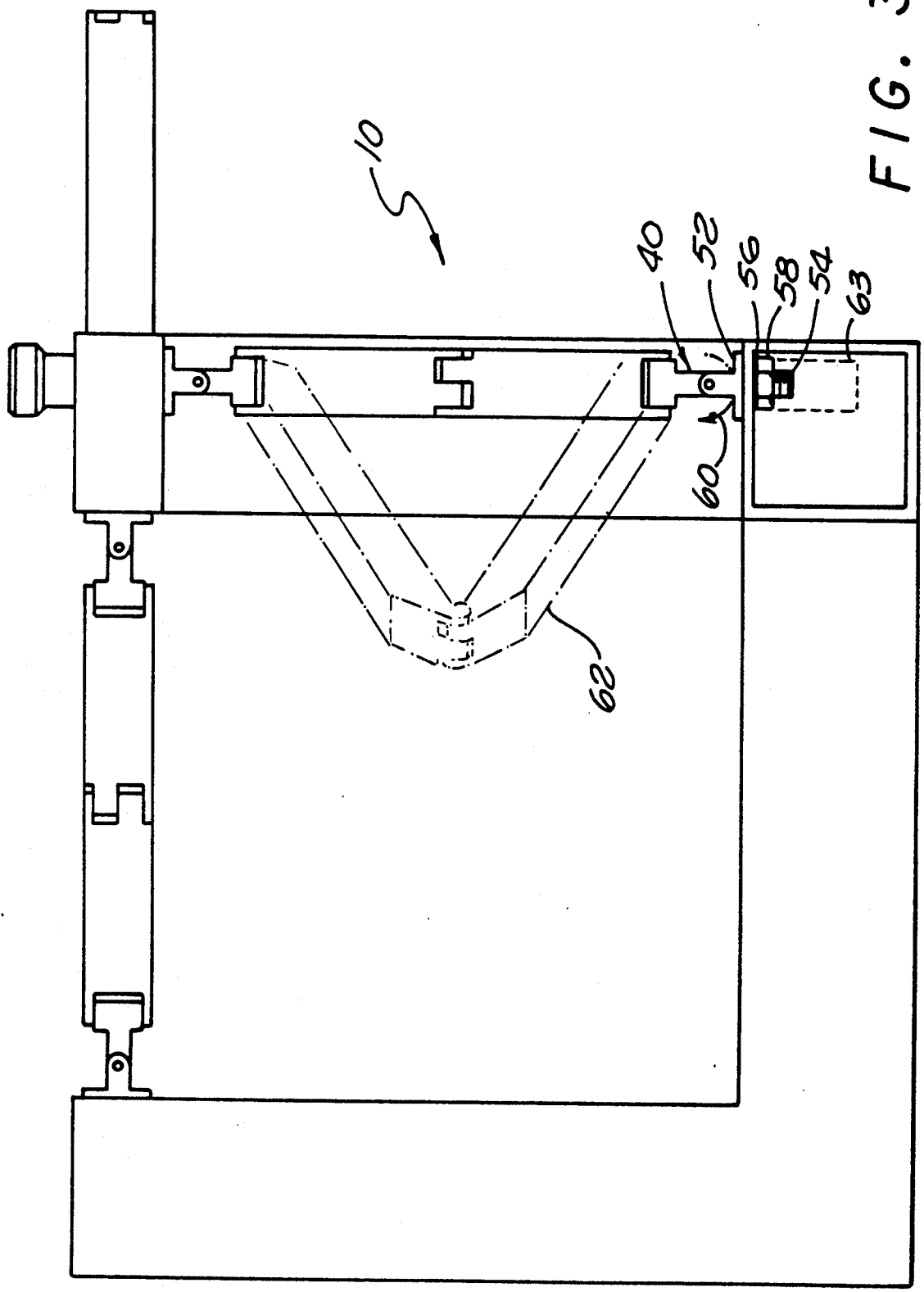

ANTI-ROTATION POSITIONING MECHANISM

BACKGROUND OF THE INVENTION

1. Field of the Invention

This invention relates to linkage mechanisms and more particularly to an apparatus for maintaining the angular position of a platform relative to a base during motion of the platform in any direction relative to the base.

2. Description of the Related Art

Anti-tilt mechanisms form an important class of devices used for a multitude of industrial applications. They are often characterized by pivoting links (occasionally compromised by a sliding elements, allowing platform motion in the x, y, z-direction, with the ultimate goal being the maintenance of the angular position of a platform while allowing the three degrees of linear motion.

A typical application of such a platform is for supporting and positioning an optical sensor such as a camera or telescope. Other applications may include, for example, areas of manufacturing machinery. In these applications, including milling and drilling operations, parallel holes or grooves may be cut in the workpiece mounted on the platform.

Currently, for such anti-tilt applications, ways are used in milling machines, etc. Use of such ways are deficient because the sliding ways are expensive and high in friction.

OBJECTS AND SUMMARY OF THE INVENTION

It is principal object of the present invention, therefore, to maintain the angular position of a platform during movement thereof relative to a static base.

It is another object to provide an anti-rotation mechanism which is low in cost and is lightweight.

Another object is to prevent rotation of a platform by means of pivoting links.

Still another object of the present invention is to provide remote means for travel of the platform while maintaining its angular position.

These and other objects are achieved by the present invention which maintains the angular position of a platform during motion of the platform in any direction relative to a base. The apparatus includes a static base, a platform, a first arm assembly, a second arm assembly and a third arm assembly. The first arm assembly has a first terminal portion connected to a first portion of the static base, by a first universal joint, and a second terminal portion, connected to the platform, by a second universal joint. The first arm assembly is so constructed to permit changes in the distance between the first and second universal joints, but concomitantly removes a first degree of angular freedom from the platform.

The second arm assembly has a respective first terminal portion connected to a second portion of the static base, by a third universal joint, and a respective second terminal portion connected to the platform by a fourth universal joint. The second arm assembly is so constructed to permit changes in the distance between the third and fourth universal points but removes a second degree of angular freedom from the platform.

A third arm assembly has a respective first terminal portion connected to a third portion of the static base by a fifth universal joint and a respective second terminal portion connected to the platform by a sixth universal joint. The third arm assembly is so constructed to permit changes in the distance between the fifth and sixth universal joints, but concomitantly removes the third and final degree of angular freedom from the platform.

The angular position of the platform is thereby maintained when the distance between the first and second universal joints and/or the distance between the third and fourth universal joints and/or the distance between the fifth and sixth universal joints is changed.

By locking the outboard hinge of the four universal joints of the first two arm assemblies, the present invention may be converted to a straight line mechanism. The third arm assembly may be allowed to simply idle, or it may be deleted. Outboard hinge, as defined herein, is the hinge located outwardly from its respective arm assembly.

Other objects, advantages and novel features of the present invention will become apparent from the following detailed description of the invention when considered in conjunction with the accompanying drawings.

BRIEF DESCRIPTION OF THE DRAWINGS

FIG. 2 is a side elevation view of the apparatus, shown along line 2—2 of FIG. 1.

FIG. 3 is a side elevation view of the apparatus, shown along line 3—3 of FIG. 1.

The same elements or parts throughout the figures of the drawings are designated by the same reference characters.

DETAILED DESCRIPTION OF THE PREFERRED EMBODIMENTS

Figure 1:
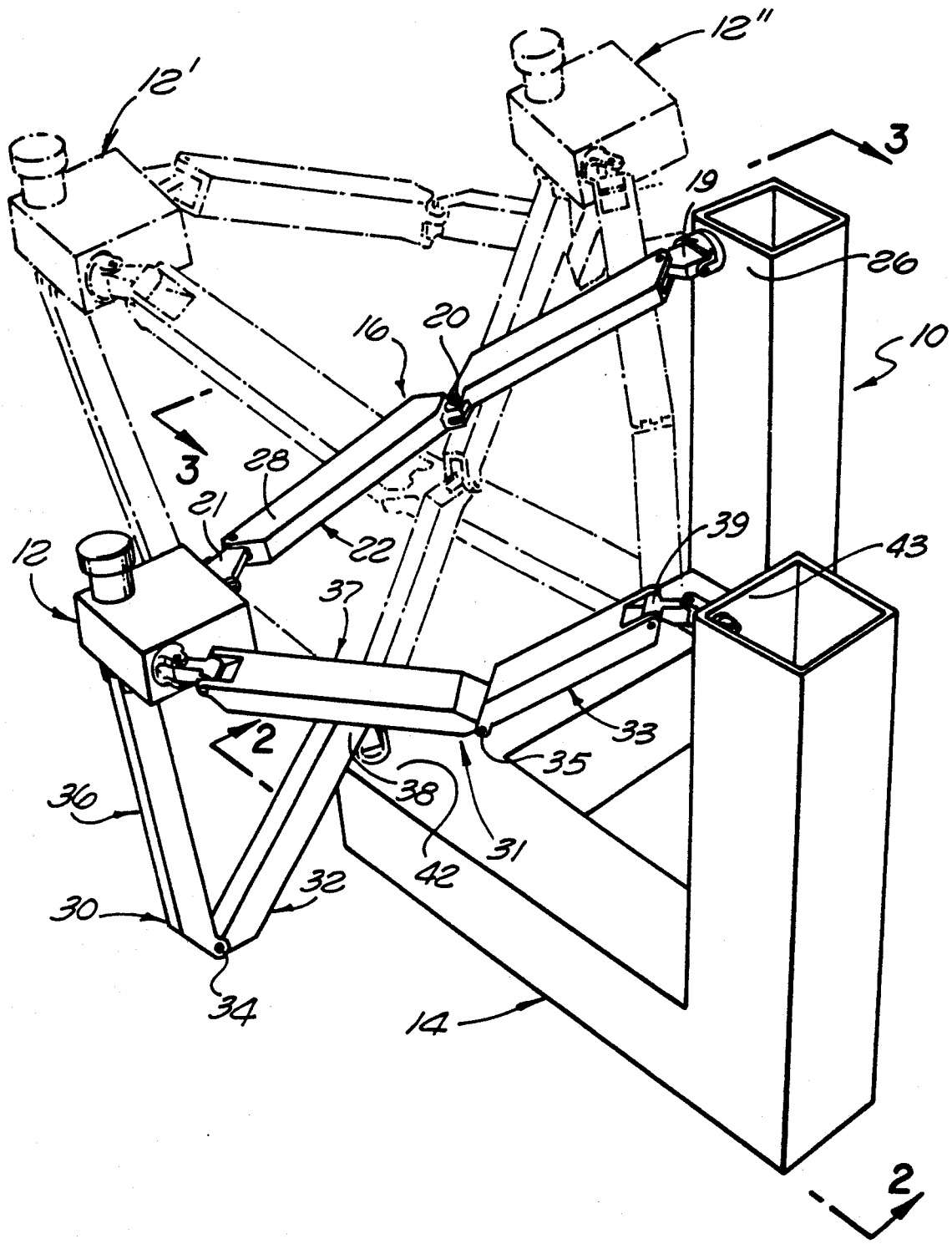
FIG. 1 is a perspective view of an apparatus for maintaining the angular position of a platform during motion thereof in any direction, according to the invention.

Referring to the drawings and the characters of reference marked thereon, FIG. 1 illustrates a preferred embodiment of the apparatus of the present invention, designated generally as 10. It is designed to maintain the angular orientation of a platform 12 constant during any movement of the platform 12 relative to a base 14. The base 14 remains static relative to the platform 12. A first arm (or elbow) assembly 16 includes a first arm 18 pivotally connected by an elbow hinge 20 to a second arm 22. The first arm 18 is connected by a universal joint 19 at a first terminal position 24 to a first portion 26 of the static base 14. The second arm 22 is connected by a second universal joint 21 at a second terminal portion 28 to the platform 12. The elbow assembly 16 permits changes in the distance between the first and second universal joints 19,21 but removes a first degree of angular freedom from the platform 12.

A second elbow (or arm) assembly, designed generally as 30, similarly includes a first arm 32 pivotally connected at an elbow hinge 34 to a second arm 36. A first terminal portion 38 of the first arm 32 is connected by a third universal joint 40 to a second portion 42 of the static base 14.

The second arm 36 of the second arm assembly 30 is connected by a fourth universal joint 44 to the platform 12. The second arm assembly 30 permits changes in the distance between the 3rd and 4th universal joints 40,44, but removes a second degree of angular freedom from the platform 12. A third elbow assembly, designed generally as 31, similarly includes a first arm 33 pivotally connected at an elbow hinge 35 to a second arm 37. A first terminal portion of the first arm 33 is connected by a fifth universal joint 39 to a third portion 43 of the static base 14.

The second arm 37 of the third arm assembly 31 is connected by a sixth universal joint 41 to the platform 12. The third arm assembly 31 permits changes in the distance between the fifth and sixth universal joints 39, 41, but removes the third and final degree of angular freedom from the platform 12. Thus, the angular position of the platform 12 is maintained constant when the platform is moved. Movement of the platform to a second position is illustrated by the phantom lines indicted by 12' and movement to a third position is illustrated by phantom lines 12".

The attachment centerlines of the second, fourth and sixth universal joints (21, 44 and 41, respectively) are angularly disposed with respect to each other. The attachment centerlines of the first, third and fifth universal joints (19, 40 and 39, respectively) are similarly angularly disposed with respect to each other.

FIG. 2 is an elevational view illustrating the platform 12 located at a position which is directly coincident with the vertical member 46 of the static base 14. Conventional universal joints may be used, each having two pivoting axes that are angularly disposed at 90°.

It is understood that the universal joints of the present invention may not be constrained to the specific angular orientations illustrated in FIGS. 1 and 2. However, their attachment centerlines must be angularly disposed at some angle other than zero, with respect to one another.

Figure 4:
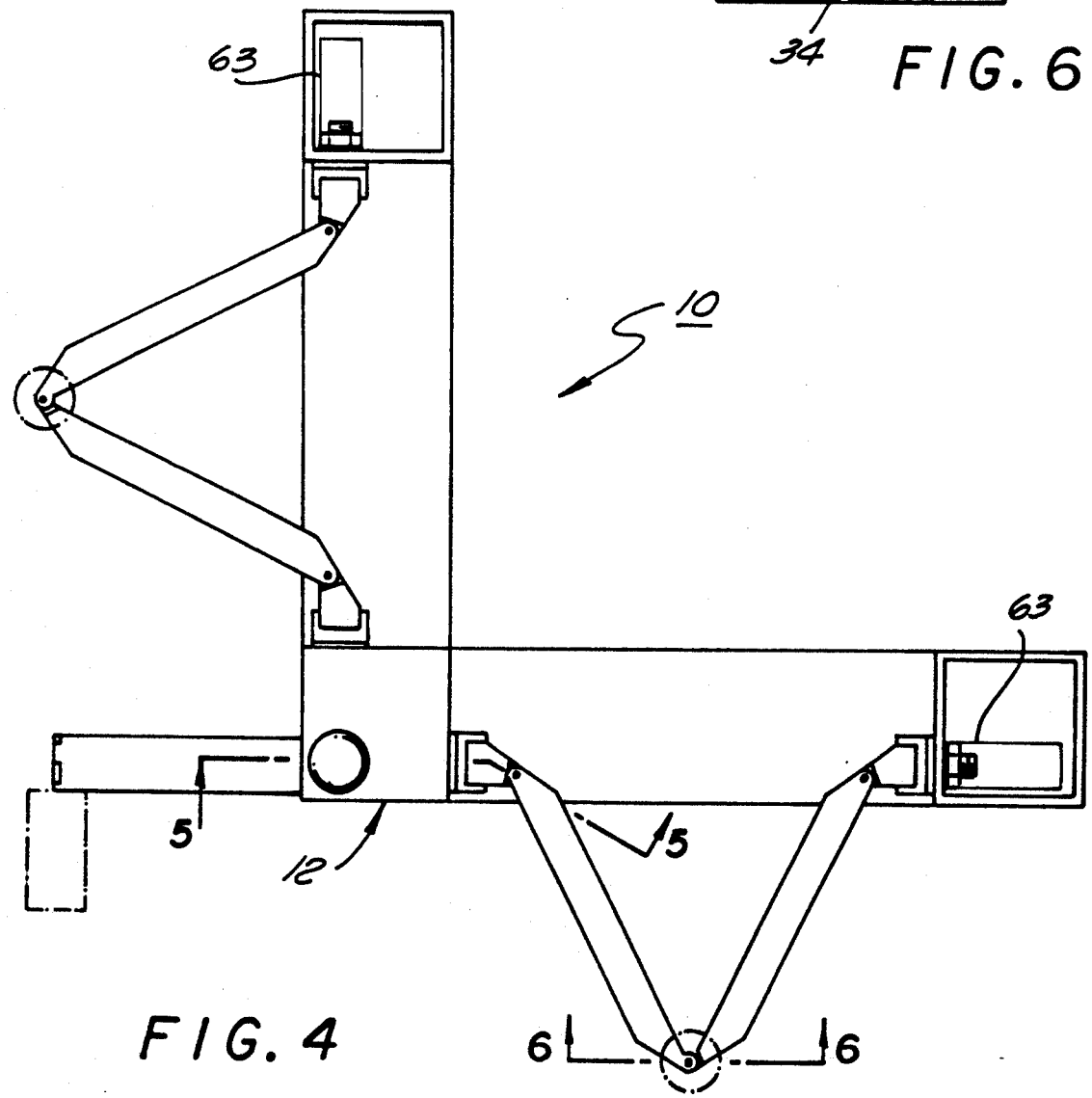
FIG. 4 is a top view of the apparatus, shown along line 4—4 of FIG. 3.

As illustrated in FIG. 3, such a universal joint 40 may contain, for example, a fitting 52 terminating in a stud 54 secured by a washer 56 and nut 58. Thus, the second arm assembly 30 may be rotated along arrow 60 to, for example, the fixed position, designated 62, in FIG. 3, depending on the stability characteristics of the particular system and its intended use. Rotation of universal joint 40 requires an identical rotation of the universal joint 44 which is attached to the platform 12. A conventional rotary actuator 63, indicated by phantom lines, may replace the threaded attachment 54 to rotate its associated universal joint for remote angular adjustment of the platform 12. Rotary actuators may be attached to the platform, base, or between arms of the elbow assemblies. FIG. 4 illustrates a top view of the apparatus 10.

Figure 5:
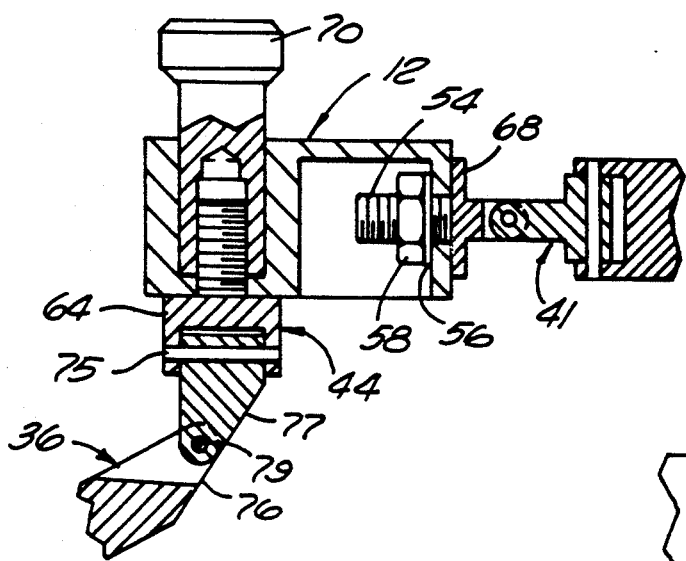
FIG. 5 illustrates an example of a platform connection, in partial cross-section.

Referring now to FIG. 5, connection of fittings 64, 68 of universal joints 41, 44 to the platform 12 are illustrated. A platform handle 70 serves as the nut for the stud 72 of the lower fitting 64. Fitting 64 attaches, by pin 75, to another fitting 77. Fitting 77 connects, via pin 79, to the second terminal end 76 of the first arm 36. FIG. 5 also illustrates a washer 56 and nut 58 threadedly engaging a stud 54 of the fitting 68.

Figure 6:
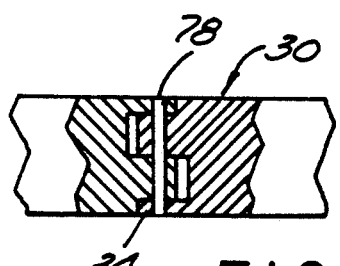
FIG. 6 illustrates an elbow hinge.

In FIG. 6, elbow assembly 30 is shown broken away to illustrate the elbow hinge 34, formed, in part, by pin 78.

There are many applications which would derive benefits from the use of the present invention. Although it would be impossible to identify all such applications, a few of these possibilities will be described below in somewhat generic terms.

The present invention can replace the widely used x-y-z mechanism, which generally consists of three mutually perpendicular linear motion assemblies. The latter typically consists of T-slots slides, jack screws, or telescoping tubes, any of which could include ball or roller antifriction elements. The work platform can thus maintain a given angular attitude, while permitting full use of all three degrees of linear motion. If the angular position is adjustable, additional machinery must be added. The resulting device is complex, heavy, costly, and sensitive to contamination, which can cause jamming in a hostile environment.

The present invention, whether manually or remotely operated, provides the same performance as the sliding systems now used, but uses pivoting links, which are inherently low in friction, easier to manufacturer, and virtually immune to jamming. This simpler mechanism has relatively few parts, is less costly, and is more reliable.

Applications of anti-tilt mechanisms include use as maintenance platforms, plotters, use in machining operations for circuit boards and other panel-based assemblies, welding, soldering, and coating; use of a base for optical sensors, such as telescopes, inspection devices, and commercial motion picture cameras.

Obviously, many modifications and variations of the present invention are possible in light of the above teachings. It is therefore to be understood that, within the scope of the appended claims, the invention may be practiced otherwise than as specifically described.

For example, although in the embodiment illustrated each arm assembly comprises an elbow assembly having a first arm pivotally connected to a second arm each arm assembly may instead comprise a first tube telescopically engaged in a second tube. The first and second tubes should be keyed against relative rotation therebetween.

What is claimed and desired to be secured by Letters Patent of the United States is:

1. An apparatus for maintaining the angular position of a platform during motion thereof in any direction, comprising:
   a) a static base;
   b) a platform;
   c) a first arm assembly having a first terminal portion connected to a first portion of said static base by a first universal joint and a second terminal portion connected to said platform by a second universal joint, said first arm assembly being so constructed to permit changes in the distance between said first and second universal joints, but concomitantly removing a first degree of angular freedom from said platform;
   d) a second arm assembly having a respective first terminal portion connected to a second portion of said static base by a third universal joint and a respective second terminal portion connected to said platform by a fourth universal joint, said second arm assembly being so constructed to permit changes in the distance between said third and fourth universal joints, but concomitantly removing a second degree of angular freedom from said platform; and
   e) a third arm assembly having a respective first terminal portion connected to a third portion of said static base by a fifth universal joint and a respective second terminal portion connected to said platform by a sixth universal joint, said third arm assembly being so constructed to permit changes in the distance between said fifth and sixth universal joints, but concomitantly removing the final degree of angular freedom from said platform, the attachment centerlines of said second, fourth and sixth universal joints being angularly disposed with respect to each other and the attachment centerlines of said first, third, and fifth universal joints being angularly disposed with respect to each other, the angular position of said platform being maintained when the distance between said first and second universal joints and/or the distance between said third and fourth universal joints and/or the distance between said fifth and sixth universal joints is changed.

2. The apparatus of claim 1, wherein said first, second and third arm assemblies, each comprise:

an elbow assembly comprising a first arm pivotally connected to a second arm.

3. The apparatus of claim 1, wherein said static base includes rotary actuation means attached to an arm assembly for providing adjustments in the angular orientation of said arm assembly, thereby providing adjustments in the angular position of said platform.

4. The apparatus of claim 1, wherein said static base includes rotary actuation means attached to an arm assembly for providing the desired changes in the distance between said first and second universal joints and/or said third and fourth universal joints and/or said fifth and sixth universal joints.

5. The apparatus of claim 1, wherein at least one of said arms assemblies further includes rotary actuation means attached thereto for providing the desired changes in the distance between said first and second universal joints and/or said third and fourth universal joints and/or said fifth and sixth universal joints.

6. The apparatus of claim 1, wherein the outboard hinge of said first, second, third and fourth universal joints are locked, thereby providing straight line motion of said platform.

7. An apparatus for maintaining motion of a platform in a straight line, comprising:

a) a static base;

b) a platform;

c) a first elbow assembly comprising a first arm pivotally connected to a second arm, a first terminal portion of said first elbow assembly being connected to a first portion of said static base by a first universal joint, a second terminal portion of said elbow assembly being connected by a second universal joint to said platform, said first elbow assembly being so constructed to permit changes in the distance between said first and second universal joints, but concomitantly removing a first degree of angular freedom from said platform;

d) a second elbow assembly comprising a first arm pivotally connected to a second arm, a first terminal portion of said second elbow assembly being connected to a second portion of said static base by a third universal joint, a second terminal portion of said second elbow assembly being connected by a fourth universal joint to said platform, said second elbow assembly being so constructed to permit changes in the distance between said third and fourth universal joints, but concomitantly removing a second degree of angular freedom from said platform; and e) a third elbow assembly comprising a first arm pivotally connected to a second arm, a first terminal portion of said third elbow assembly being connected to a third portion of said static base by a fifth universal joint, a second terminal portion of said third elbow assembly being connected by a sixth universal joint to said platform, said third elbow assembly being so constructed to permit changes in the distance between said fifth and sixth universal joints, but concomitantly removing the final degree of angular freedom from said platform, the attachment centerlines of said second, fourth and sixth universal joints being angularly disposed with respect to each other and the attachment centerlines of said first, third and fifth universal joints being angularly disposed with respect to each other, the angular position of said platform being maintained when the distance between said first and second universal joints and/or the distance between said third and fourth universal joints and/or the distance between said fifth and sixth universal joints is changed.

8. The apparatus of claim 7, wherein said static base includes rotary actuation means attached to an elbow assembly for providing adjustments in the angular orientation of said elbow assembly, thereby providing adjustments in the angular position of said platform.

9. The apparatus of claim 7, wherein said static base includes rotary actuation means attached to an elbow assembly for providing the desired changes in the distance between said first and second universal joints and/or said third and fourth universal joints and/or said fifth and sixth universal joints.

10. The apparatus of claim 7, wherein at least one of said elbow assemblies further includes rotary actuation means attached thereto for providing the desired changes in the distance between said first and second universal joints and/or said third and fourth universal joints and/or said fifth and sixth universal joints.

* * * * *